(12) United States Patent
Zope et al.

(10) Patent No.: US 12,038,740 B2
(45) Date of Patent: Jul. 16, 2024

(54) METHOD AND SYSTEM FOR REGIME-BASED PROCESS OPTIMIZATION OF INDUSTRIAL ASSETS

(71) Applicant: Tata Consultancy Services Limited, Mumbai (IN)

(72) Inventors: Kalyani Zope, Pune (IN); Sri Harsha Nistala, Pune (IN); Venkataramana Runkana, Pune (IN); Aditya Pareek, Pune (IN); Vishnu Swaroopji Masampally, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 365 days.

(21) Appl. No.: 17/450,243

(22) Filed: Oct. 7, 2021

(65) Prior Publication Data

US 2022/0107630 A1 Apr. 7, 2022

(30) Foreign Application Priority Data

Oct. 7, 2020 (IN) .............................. 202021043590

(51) Int. Cl.
 *G05B 19/418* (2006.01)
 *G06F 18/231* (2023.01)
(52) U.S. Cl.
 CPC ..... *G05B 19/4184* (2013.01); *G05B 19/4183* (2013.01); *G05B 19/4188* (2013.01); *G06F 18/231* (2023.01)
(58) Field of Classification Search
 None
 See application file for complete search history.

(56) References Cited

U.S. PATENT DOCUMENTS

2018/0330300 A1* 11/2018 Runkana ................ G05B 15/02

FOREIGN PATENT DOCUMENTS

EA 035009 B1 4/2020

OTHER PUBLICATIONS

Bhattacharya et al., "Online Discovery and Classification of Operational Regimes from an Ensemble of Time Series Data," Journal of Dynamic Systems, Measurement and Control (2020).

(Continued)

*Primary Examiner* — Ryan A Jarrett
(74) *Attorney, Agent, or Firm* — Finnegan, Henderson, Farabow, Garrett & Dunner, LLP

(57) ABSTRACT

This disclosure relates to a method and system for regime-based process optimization of various assets of industrial manufacturing and process plants or units. Operating regimes of assets are identified and a regime similarity score of each asset is computed from regime sequences of integrated industrial data and compared with a given threshold to identify regimes of operation. Operating regimes are matched with regimes of regime database and industrial assets and similar operating regimes are group together. Process optimization is carried out for each group of industrial assets to identify optimum settings in order to maximize output or minimize loss/cost considering process and equipment constraints. Anomalies are analyzed in the unmatched operating regimes and a diagnosis is carried out to identify the root cause for any detected anomalies. Remaining useful life of components in the assets with unmatched operating regimes is estimated to ensure component reliability and to prevent failure.

9 Claims, 5 Drawing Sheets

(56) References Cited

OTHER PUBLICATIONS

Saari et al., "Detecting operation regimes using unsupervised clustering with infected group labelling to improve machine diagnostics and prognostics," Operations Research Perspectives, 5:232-244 (2018).

* cited by examiner

METHOD AND SYSTEM FOR REGIME-BASED PROCESS OPTIMIZATION OF INDUSTRIAL ASSETS

CROSS-REFERENCE TO RELATED APPLICATIONS AND PRIORITY

This U.S. patent application claims priority under 35 U.S.C. § 119 to India Application No. 202021043590, filed on Oct. 7, 2020. The entire content of the abovementioned application is incorporated herein by reference.

TECHNICAL FIELD

The disclosure herein generally relates to the field of industrial data analytics and specifically, to a method and system for regime-based process optimization of a plurality of industrial assets.

BACKGROUND

Performance indicators such as productivity, product quality, energy consumption, availability, maintenance expenditure, percentage of emergency work, etc. are used to monitor the performance of processes, equipment and assets involved in the manufacturing and process industries. Industries today face the challenge of meeting ambitious production targets, minimizing their energy consumption, meeting emission standards, and customizing their products, while handling wide variations in raw material quality. Industrial assets strive to continuously improve their performance indicators by modulating few parameters that are known to influence processes and equipment.

Many operational units in industries have dynamic behavior and multiple regimes of operation that change depending on the input materials used in the process, operational strategy, wear & tear of equipment and maintenance activities. Examples of such units are reactors, gas turbines, combustion engines, etc. In order to perform process optimization and/or predictive maintenance (fault detection, fault diagnosis and RUL estimation) for these units, particularly when multiple such units are being monitored, it is important to identify the regime of operation of the units. For example, original equipment manufacturers (OEMs) that supply gas turbines to CCGT (combined cycle gas turbine) plants offer remote monitoring services to their end-users. During remote monitoring, operations and equipment data such as flow rate, pressure, temperature, vibration, etc. from different locations are brought to a central remote monitoring center where gas turbine experts analyze the data and try to identify the regime of operation, detect process faults and suggest appropriate measures to the gas turbine operators to prevent failure and/or to improve the performance of the turbine.

Traditional techniques such as Mahalanobis distance (MD) and principal component analysis (PCA) may be used for regime identification in industrial data but these techniques are not effective as they do not consider the temporal relationship that exists in industrial data.

SUMMARY

Embodiments of the disclosure present technological improvements as solutions to one or more of the above-mentioned technical problems recognized by the inventors in conventional systems. For example, in one embodiment, a system and method for regime-based process optimization of a plurality of industrial assets is provided.

In one aspect, a processor-implemented method for regime-based process optimization of a plurality of industrial assets is provided. The method includes one or more steps such as receiving a plurality of data from one or more databases of the plurality of industrial assets at a pre-determined frequency, and pre-processing the received plurality of data according to one or more predefined formats of the data, removal of redundant data, unification of sampling frequency, identification and removal of outliers, imputation of missing data, and synchronization and integration of a plurality of variables from one or more databases.

The processor-implemented method includes computing a plurality of soft-sensor data using the preprocessed data of the plurality of industrial assets, integrating the preprocessed plurality of data and the computed plurality of soft-sensor data to obtain an integrated data for each of the plurality of industrial assets, and identifying one or more regimes of operation of the plurality of industrial assets from the integrated data using a hierarchical clustering on segmented data. Herein, the hierarchical clustering obtaining one or more regime sequences from the integrated data, computing a regime similarity score corresponding to each of the one or more regime sequences, and comparing the computed regime similarity score with a predefined threshold of regime similarity score to identify one or more regimes of operation of the plurality of industrial assets. Further, the plurality of industrial assets is grouped into one or more groups based on the identified one or more regimes of operation and a plurality of key performance parameters of each of the plurality of industrial assets are optimized using the plurality of soft-sensor data. And, finally, one or more process optimization settings are recommended to one or more variables of the plurality of industrial assets.

Furthermore, the processor-implemented method comprising determining at least one from the one or more regimes of operation unmatched regime of operation based on comparison with at least one past regime of operation stored in a regime database and detecting presence of anomalies in the at least one unidentified regime of operation using a plurality of data-driven anomaly detection models. A plurality of data-driven anomaly diagnosis models is used to identify at least one cause of the detected anomalies in the regime of operation of the plurality of assets. It is to be noted that the optimization models are re-tuned based on adaptive learning for non-anomalous unmatched regime of operations. Finally, a remaining useful life (RUL) of the plurality of assets is estimated based on the identified cause of the anomaly to recommend early warning of failure of one or more assets.

In another aspect, a system for regime-based process optimization of industrial assets is provided. The system includes an input/output interface configured to receive a plurality of data from one or more databases of an industrial manufacturing plant at a pre-determined frequency, at least one memory storing a plurality of instructions and one or more hardware processors communicatively coupled with the at least one memory, wherein the one or more hardware processors are configured to execute the plurality of instructions stored in the at least one memory. Further, the system is configured to pre-process the received plurality of data for verification of availability of received plurality of data, removal of redundant data, unification of sampling frequency, identification and removal of outliers, imputation of missing data, and synchronization and integration of a plurality of variables from one or more databases. Further, the system is configured to compute a plurality of soft-sensor data using the preprocessed data of the plurality of industrial assets, integrate the preprocessed plurality of data and the computed plurality of soft-sensor data to obtain an integrated data for each of the plurality of industrial assets, and identify one or more regimes of operation of the plurality of industrial assets from the integrated data using a hierarchical clustering on segmented data. Herein, the hierarchical clustering obtains one or more regime sequences from the integrated data, computes a regime similarity score (RSS) corresponding to each of the one or more regime sequences, and compares the computed regime similarity score with a predefined threshold of regime similarity score to identify one or more regimes of operation of the plurality of industrial assets. Further, the plurality of industrial assets are grouped into one or more groups based on the identified one or more regimes of operation and a plurality of key performance parameters of each of the plurality of industrial assets are optimized using the plurality of soft-sensor data. And, finally, one or more process optimization settings are recommended to one or more variables of the plurality of industrial assets.

Furthermore, the system is configured to determine at least one unmatched regime of operation from the one or more regimes of operation based on comparison with at least one past regime of operation stored in a regime database and detect presence of anomalies in the at least one unidentified regime of operation using a plurality of data-driven anomaly detection models. A plurality of data-driven anomaly diagnosis models is used to identify at least one cause of the detected anomalies in the regime of operation of the plurality of assets. It is to be noted that the optimization models are re-tuned based on adaptive learning for non-anomalous unmatched regime of operations. The system is configured to estimate a remaining useful life (RUL) of the plurality of assets based on the identified cause of the anomaly to recommend an early warning of failure of one or more assets.

In yet another aspect, a non-transitory computer readable medium storing one or more instructions which when executed by one or more processors on a system, cause the one or more processors to perform method for regime-based process optimization of a plurality of industrial assets. The method includes one or more steps such as receiving a plurality of data from one or more databases of the plurality of industrial assets at a pre-determined frequency, and pre-processing the received plurality of data according to one or more predefined formats of the data, removal of redundant data, unification of sampling frequency, identification and removal of outliers, imputation of missing data, and synchronization and integration of a plurality of variables from one or more databases.

The processor-implemented method includes computing a plurality of soft-sensor data using the preprocessed data of the plurality of industrial assets, integrating the preprocessed plurality of data and the computed plurality of soft-sensor data to obtain an integrated data for each of the plurality of industrial assets, and identifying one or more regimes of operation of the plurality of industrial assets from the integrated data using a hierarchical clustering on segmented data. Herein, the hierarchical clustering obtaining one or more regime sequences from the integrated data, computing a regime similarity score corresponding to each of the one or more regime sequences, and comparing the computed regime similarity score with a predefined threshold of regime similarity score to identify one or more regimes of operation of the plurality of industrial assets. Further, the plurality of industrial assets is grouped into one or more groups based on the identified one or more regimes of operation and a plurality of key performance parameters of each of the plurality of industrial assets are optimized using the plurality of soft-sensor data. And, finally, one or more process optimization settings are recommended to one or more variables of the plurality of industrial assets.

Furthermore, the processor-implemented method comprising determining at least one from the one or more regimes of operation unmatched regime of operation based on comparison with at least one past regime of operation stored in a regime database and detecting presence of anomalies in the at least one unidentified regime of operation using a plurality of data-driven anomaly detection models. A plurality of data-driven anomaly diagnosis models is used to identify at least one cause of the detected anomalies in the regime of operation of the plurality of assets. It is to be noted that the optimization models are re-tuned based on adaptive learning for non-anomalous unmatched regime of operations. Finally, a remaining useful life (RUL) of the plurality of assets is estimated based on the identified cause of the anomaly to recommend early warning of failure of one or more assets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
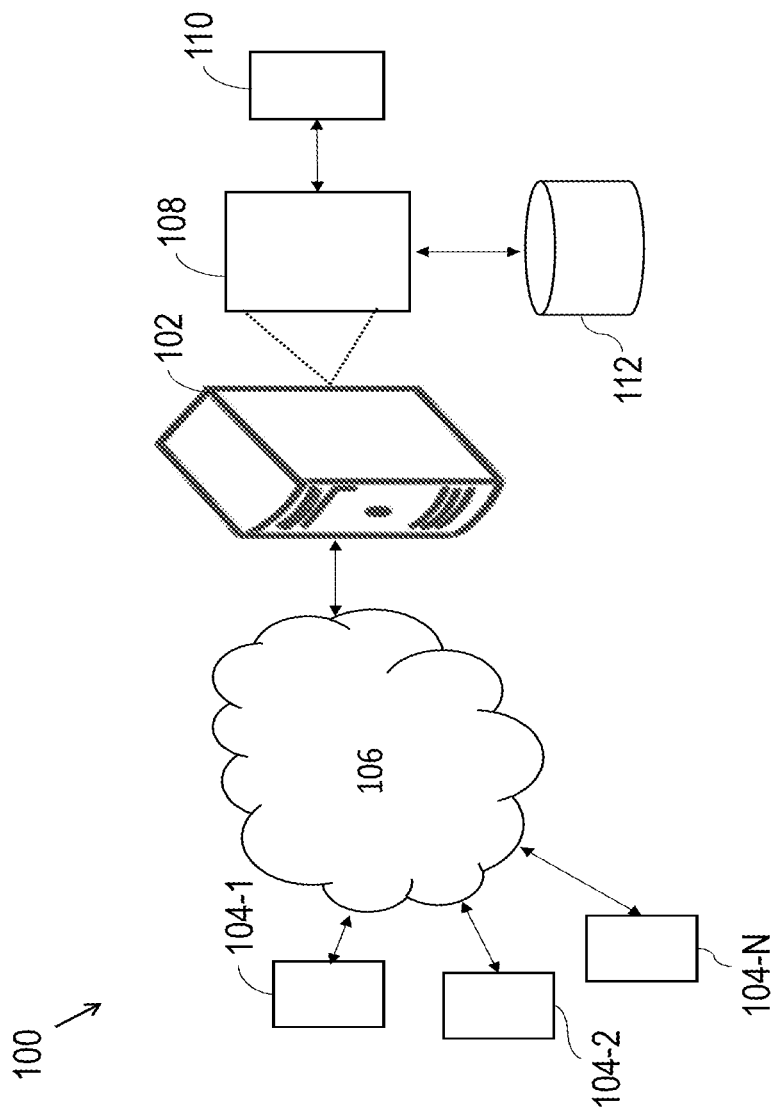
FIG. 1 illustrates an exemplary system for regime-based process optimization of a plurality of industrial assets of industrial manufacturing plant or process, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for regime-based process optimization of various assets of industrial manufacturing and process plants or units. Operating regimes of various assets are identified using temporal hierarchical clustering. A regime similarity score (RSS) of each asset is computed from regime sequences of integrated industrial data and compared with a given threshold to identify regimes of operation. Herein, the identified operating regimes are matched with regimes of regime database and industrial assets with similar operating regimes are group together. Process optimization is carried out for each group of industrial assets to identify optimum settings in order to maximize output or minimize loss/cost considering process and equipment constraints. Anomalies are analyzed in the unmatched operating regimes and a diagnosis is carried out to identify the root cause for any detected anomalies. Remaining useful life of components in the assets with unmatched operating regimes is estimated to ensure component reliability and to prevent failure. Adaptive learning for active models (that can be physics-based, data-driven or hybrid) for non-anomalous and unmatched regime either continuously or on demand depending on its configuration.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates a block diagram of a system (100) for regime-based process optimization of various assets of industrial manufacturing and process plants or units, in accordance with an example embodiment. Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
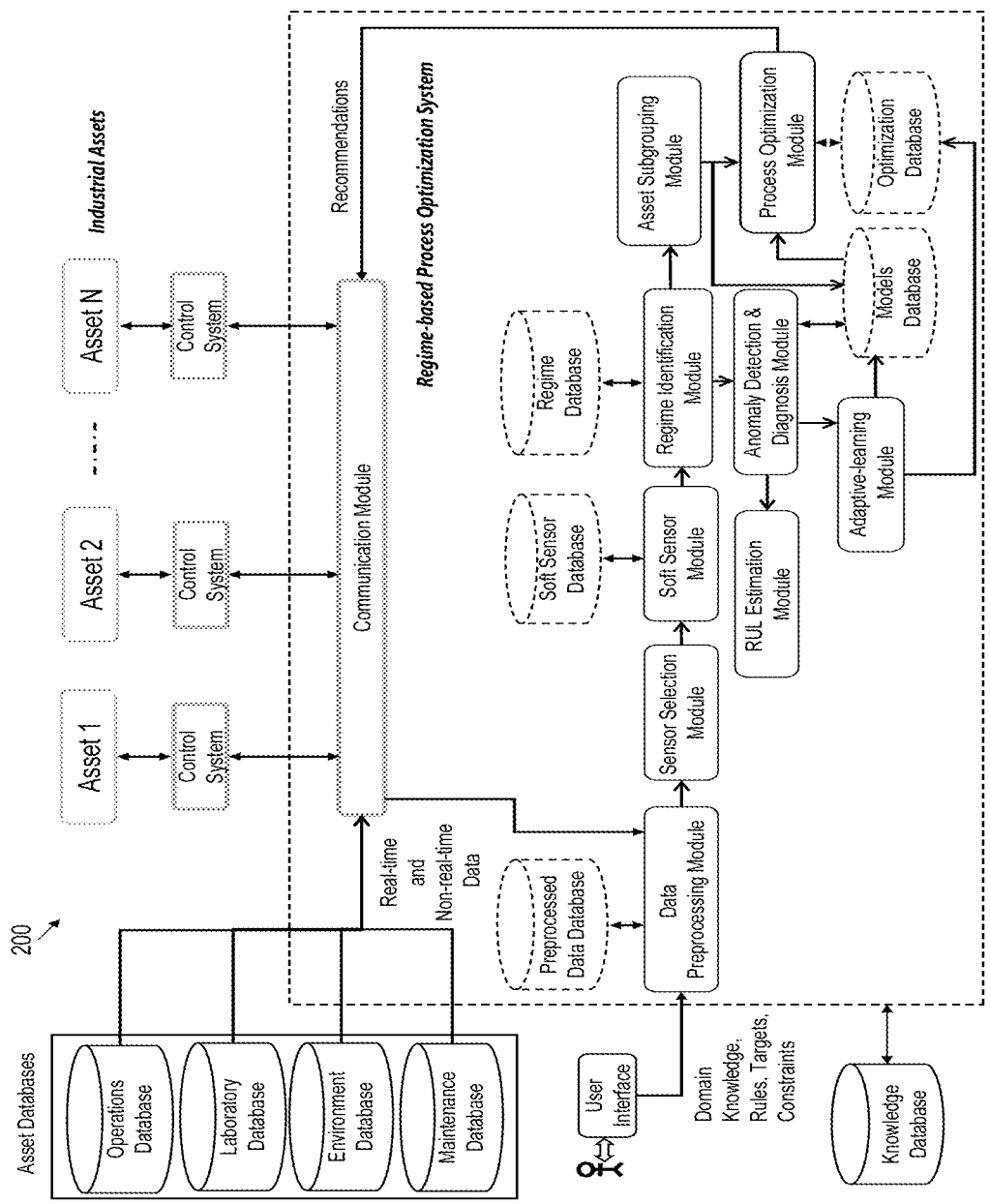
FIG. 2 illustrates an architectural diagram of a system for regime-based process optimization of industrial assets, according to an embodiment of the present disclosure.

Referring FIG. 2, illustrates an exemplary system for regime-based process optimization of a plurality of industrial assets. It would be appreciated that the industrial assets herein refer to static assets such as one or more industrial units of a processing plant, the entire process or manufacturing plant that comprises processing units in series and/or parallel, and mobile assets or equipment such as aero engine, automobile engine, etc. The industrial plant processes inputs in the form of raw materials, generates products and byproducts, and possibly solid and liquid waste and gaseous emissions. The industrial plant usually operates in an environment, and environment conditions such as ambient temperature, pressure and humidity typically influence the operation of the plant. Herein, regimes of operation of the plurality of industrial assets are identified in real-time using time series hierarchical clustering. The industrial assets having the same operating regimes are grouped and process optimization is carried out for each group utilizing the predictive models of key performance parameters, operation and quality constraints, manipulated variables (MVs) and predefined threshold limits of MVs specific to the identified regime. The outcome of optimization is recommended for the plurality of assets. However, if the identified regimes of operation are unmatched with any of the past operating regimes available in a regime database, the received real-time data is analyzed for anomalies/faults. Wherein, fault is detected in at least one of the plurality of assets, a remaining useful life (RUL) or time to failure (TTF) of the plurality of assets is estimated based on the identified cause of the anomaly to recommend early warning of failure of one or more assets.

A regime-based optimization module interacts with the one or more industrial assets via a communication layer and receives real-time and non-real-time data from several industrial process databases such as operations database, laboratory database, maintenance database, environment database and the like. It pre-processes the plant data, obtains simulated data using the pre-processed data and soft sensors, combines simulated data and pre-processed data to obtain integrated data, and uses the integrated data to provide services such as prediction, regime identification, classification, detection, diagnosis and prognosis, process optimization, model performance monitoring and adaptive learning for active models (that can be physics-based, data-driven or hybrid) either continuously or on demand depending on its configuration. The outputs of various services are shown to the user via various interfaces that are part of the regime-based optimization module.

In the one embodiment, a system (100) is configured for the regime-based optimization of one or more industrial assets. The system (100) comprises at least one memory (102) with a plurality of instructions, one or more databases (112), one or more input/output interfaces (104) and one or more hardware processors (108) which are communicatively coupled with the at least one memory (102) to execute a plurality of modules (110) therein. Further, the system comprises a pre-processing module (114), a computation module (116), a data integration module (118), a regime identification module (120), a grouping module (122), an anomaly detection and diagnosis (ADD) module (124), a RUL estimation module (126), an adaptive learning module (128), a process optimization module (130), and a recommendation module (132).

Figure 3:
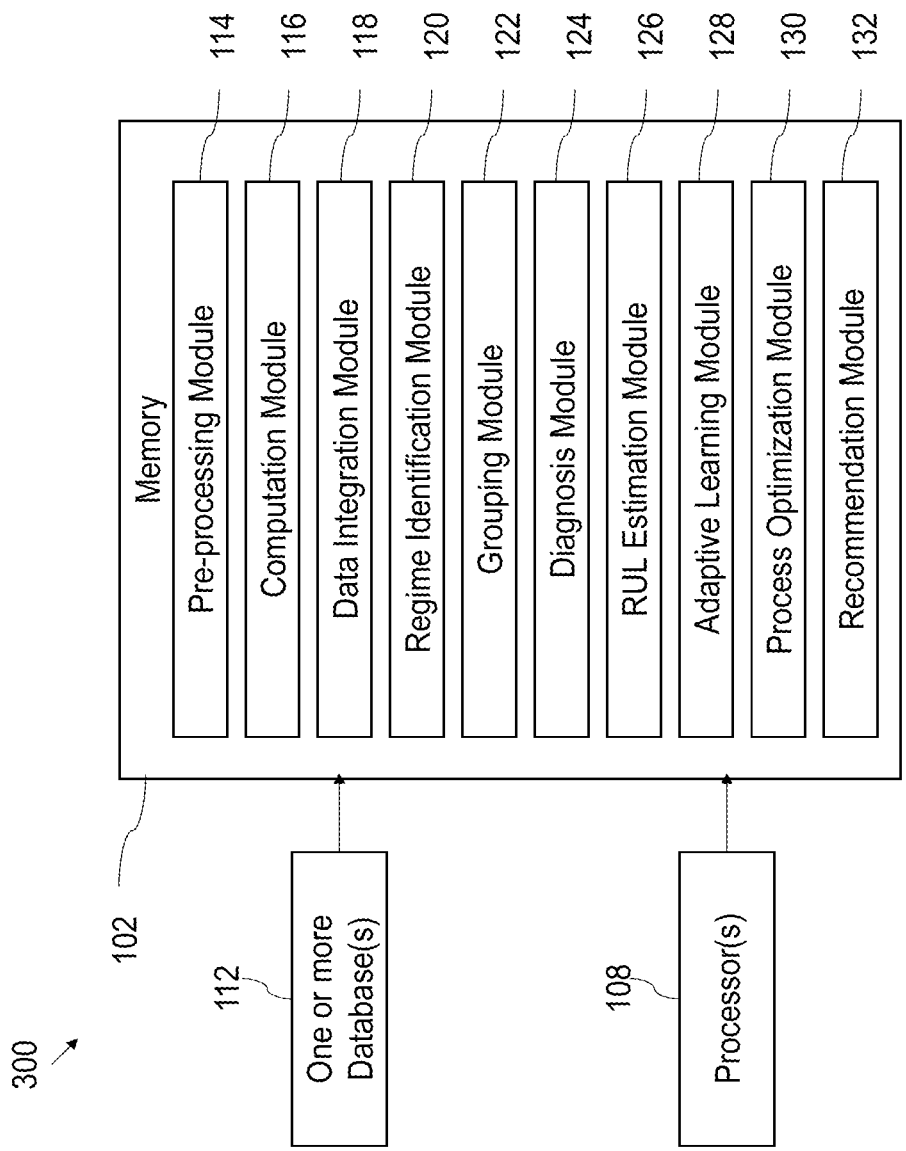
FIG. 3 is a functional block diagram to illustrate a regime-based process optimization of industrial assets, according to an embodiment of the present disclosure.

Referring FIG. 3, wherein a functional block diagram to illustrate one or more modules of the system (100). Herein, the input/output interface (106) is configured to receive real-time and non-real-time data from various databases at a pre-determined frequency (e.g. 1/second, 1/minute, 1/hour, etc.) where the frequency is configurable by the user. Real-time data includes operations data and environment data. Operations data is recorded by sensors in the industrial asset and includes temperatures, pressures, flow rates and vibrations from processes and equipment in the units of the industrial asset. Operations data is obtained from a distributed control system (DCS), OPC server, etc. and could be stored in an operations database or historian. Environment data such as ambient temperature, atmospheric pressure, ambient humidity, rainfall, etc. is also recorded by sensors and could be stored in an environment database. Non-real-time data includes data from the laboratories and maintenance activities. Laboratory data comprises of characteristics (e.g. chemical composition, size distribution, concentration, density, viscosity, calorific value, microstructural composition, etc.) of raw materials, products, byproducts, solid and liquid waste, and emissions that are tested at the laboratory. Laboratory data is typically stored and retrieved from a laboratory information management system (LIMS), relational database (RDB) or SQL database. Information related to the condition of the process and equipment, plant running status, maintenance activities performed on the industrial units, etc. is stored and retrieved from a maintenance database.

In the preferred embodiment, the pre-processing module (114) of the system (100) is configured to perform pre-processing of the real-time and non-real-time data received from multiple databases of the industrial manufacturing plant. Pre-processing involves removal of redundant data, unification of sampling frequency, filtering of data, outlier identification & removal, imputation of missing data, synchronization of data by incorporating appropriate lags, and integration of variables from various data sources.

In the preferred embodiment, the computation module (116) of the system (100) is configured to compute a plurality of soft-sensor data using the preprocessed data of the plurality of industrial assets. It is to be noted that sometimes the direct use of physical sensors may not be possible in some applications or environments due to constraints such as access requirements, extreme operating conditions, disturbances in environment, limitations of the sensors, etc. Further, the information collected from physical sensors may not be sufficient to capture the behavior of the assets. In such cases, soft sensors (either physics-based soft sensors or data-driven soft sensors) are used to generate additional information about the plant. Examples of soft sensors include temperature in the firing zone of a furnace, concentration of product or byproducts inside a reactor, etc. Soft sensors (physics-based and data-driven) are stored in soft sensor database.

It would be appreciated that the industrial data may be recorded for a plurality of sensors (typically few hundreds of sensors). Some of these sensor variables, known as manipulated variables (MVs), can be modulated/changed by operators. Some of these variables, known as disturbance variables (DVs), are external to the industrial asset and cannot be modulated/changed. Variables other than manipulated variables and disturbance variables are known as process variables; these cannot be modulated/changed directly but they can be affected by changes in MVs and DVs.

In the preferred embodiment, the data integration module (118) of the system (100) is configured to integrate the preprocessed plurality of data and the computed plurality of soft-sensor data to obtain an integrated data for each of the plurality of industrial assets. The integrated data is used for regime identification.

In the preferred embodiment, the regime identification module (120) of the system (100) is configured to identify one or more regimes of operation of the plurality of industrial assets from the integrated data using a hierarchical clustering on segmented data. Herein, the regime identification module (120) obtains one or more regime sequences from the integrated data to compute a regime similarity score (RSS) corresponding to each of the one or more historical regime sequences. Further, the regime identification module (120) may compare the computed regime similarity score with a predefined threshold of regime similarity score to identify one or more regimes of operation of the plurality of industrial assets.

Figure 4:
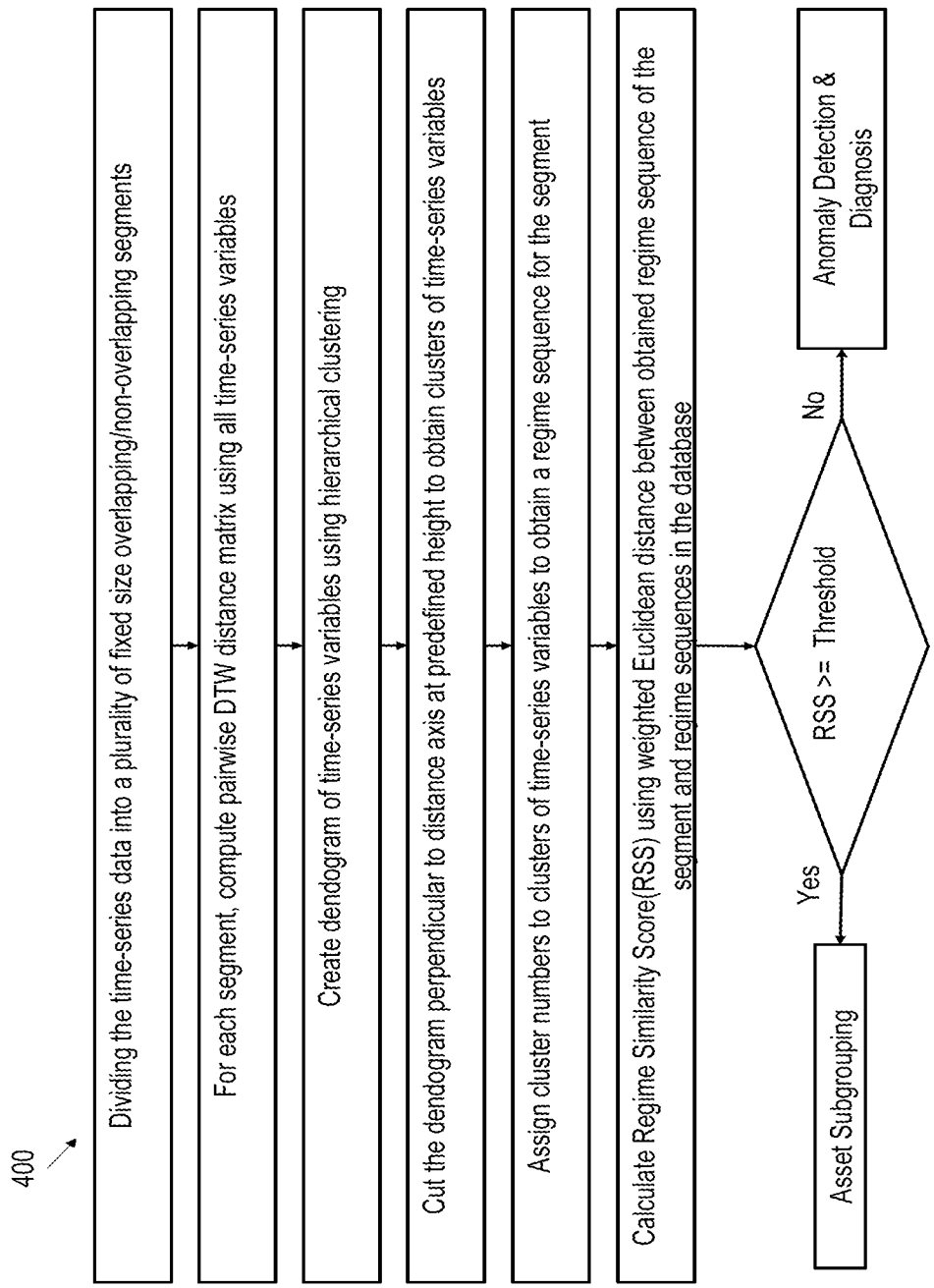
FIG. 4 is a workflow to illustrate anomaly detection and diagnosis and asset subgrouping, according to an embodiment of the present disclosure.

Referring FIG. 4, a flowchart to illustrate functioning of the regime identification module (120). Herein, the regime identification module (120) takes integrated data containing variables from each industrial asset as input. The input time series data is divided into overlapping/non-overlapping time segments of containing a fixed number of time instances that can be configured by the user. For each time segment, a distance metric between each pair of variables is calculated. Distance can be Dynamic Time Warping, braycurtis, canberra, chebyshev, cityblock, correlation, cosine, dice, euclidean, hamming, jaccard, jensenshannon, kulsinski, matching, minkowski, rogerstanimoto, russellrao, seuclidean, sokalmichener, sokalsneath, sqeuclidean, yule. Further, the hierarchical clustering is used to group the similar variables called clusters. Beginning with each variable in separate cluster, the two most similar clusters are joined into a single new cluster at each step. This is repeated until converged and a dendrogram is created as a result of hierarchical clustering.

It would be appreciated that a set of clusters for variables is obtained by cutting the dendrogram perpendicular to the distance axis at a predefined height. After cutting the dendrogram, one or more clusters of variables are obtained and herein each variable within each of the one or more clusters is assigned a unique number and the regime sequence for each segment is obtained. Sample regime sequences for few segments are shown in Table 1.

TABLE 1

| Segment | Start Time | End Time | X0 | x1 | x2 | x3 | x4 | x5 | x6 | x7 | x8 | x9 | x10 | x11 | x12 | x13 | x14 | x15 | x16 | x17 |
|---|---|---|---|---|---|---|---|---|---|---|---|---|---|---|---|---|---|---|---|---|
| S1 | Sep. 30, 2019 22:12:56 | Sep. 30, 2019 22:14:02 | 0 | 0 | 0 | 0 | 0 | 0 | 0 | 0 | 0 | 0 | 0 | 1 | 1 | 0 | 0 | 0 | 0 | 0 |

TABLE 1-continued

| Segment | Start Time | End Time | X0 | x1 | x2 | x3 | x4 | x5 | x6 | x7 | x8 | x9 | x10 | x11 | x12 | x13 | x14 | x15 | x16 | x17 |
|---|---|---|---|---|---|---|---|---|---|---|---|---|---|---|---|---|---|---|---|---|
| S2 | Sep. 30, 2019 22:13:33 | Sep. 30, 2019 22:14:41 | 0 | 0 | 0 | 0 | 0 | 0 | 0 | 0 | 0 | 0 | 0 | 1 | 1 | 1 | 1 | 2 | 0 | 0 |
| S3 | Sep. 30, 2019 22:14:10 | Sep. 30, 2019 22:15:33 | 0 | 0 | 0 | 0 | 0 | 0 | 0 | 0 | 1 | 0 | 0 | 0 | 0 | 0 | 0 | 0 | 0 | 0 |
| S4 | Sep. 30, 2019 22:14:43 | Sep. 30, 2019 22:16:02 | 0 | 0 | 0 | 0 | 0 | 0 | 0 | 0 | 1 | 0 | 0 | 0 | 0 | 0 | 1 | 0 | 0 | 0 |
| S5 | Sep. 30, 2019 22:15:40 | Sep. 30, 2019 22:16:45 | 0 | 0 | 1 | 2 | 1 | 1 | 0 | 1 | 0 | 2 | 1 | 1 | 0 | 1 | 2 | 1 | 2 | 2 |

After the regime sequences for each segment is obtained, a regime similarity score (RSS) is calculated to check if similar regime sequences are available in a historical regime database. The RSS may be calculated using weighted distance between obtained regime sequence of the segment and regime sequences available in database. Distance can be Euclidean, cityblock, cosine, euclidean, I1, I2, manhattan, braycurtis, canberra, chebyshev, correlation, dice, hamming, jaccard, kulsinski, 'mahalanobis', minkowski, rogerstanimoto, russellrao, seuclidean, sokalmichener, sokalsneath, sqeuclidean, yule. For example, weighted Euclidean distance is shown in equation 1.

$$d(R\_seg, R\_DB) = \sqrt{\Sigma wi(R\_seg i - R\_DBi)^2} \quad (1)$$

wherein, if the regime similarity score obtained for the regime sequence of the segment and any of the pre-existing regime sequences in historical regime database is greater than a predefined threshold, the regime for the time segment matches with one of the pre-existing regimes of operation. The time segment is assigned the regime ID corresponding to the pre-existing regimes of operation. Regime sequences in the historical regime database are obtained by applying regime identification on historic data segments. After applying regime sequences segments with similar regime sequences are grouped together and percentage of sequences in each group is calculated. Regime sequences with percentage higher than particular threshold are added in regime database. Prediction models are retuned for new identified regime. Sequences with percentage lower than threshold are sent to Anomaly detection and diagnosis module and added in ADD database if anomaly.

In the preferred embodiment, the grouping module (122) of the system (100) configured to group the plurality of industrial assets into one or more groups based on the regime IDs identified for one or more regimes of operation. Herein, the industrial asset is grouped with other industrial assets having same regime IDs. It is to be noted that wherein the RSS of the one or more regime sequences with respect to any of the pre-existing regime sequences is less than the predefined threshold, the operating regime identified for the segment does not match with any of the past operating regimes available in regime database. The data segment is then checked for anomalies/faults.

In the preferred embodiment, the diagnosis module (124) of the system (100) configured to detect anomaly in the unmatched regime of operation and a diagnosis is carried out to identify the root cause for the fault and the sensor contributing to anomalies. Statistical and Deep Learning techniques are used for Anomaly Detection and Diagnosis. Some multivariate statistical techniques are Principal Component Analysis, One-Class Support Vector Machine, Isolation Forest, Local Outlier Factor, Mahalanobis Distance, Elliptic Envelope, and deep learning techniques are LSTM Autoencoder, Dense Autoencoder and Convolutional Autoencoder etc.

In another aspect, wherein the RSS of the one or more regimes of operation is less than predefined threshold and the data segment is not reported as anomaly by the diagnosis module (124), then regime sequence obtained for this segment is added as new regime in the Regime database.

In the preferred embodiment, the RUL estimation module (126) of the system (100) is configured to estimate health of one or more components of the industrial asset and to estimate remaining useful life (RUL) or time to failure (TTF) due to the detected anomaly. If RUL of the components are predicted in advance, actions such as inspection, maintenance or replacement can be done in advance before failure of the component. The diagnosis module (124) and RUL estimation module (126) are built using data-driven techniques involving machine learning and, deep learning approaches, physics-based techniques, and their combinations.

In the preferred embodiment, the adaptive learning module (128) of the system (100) is configured to re-tune one or more predictive models according to the unmatched and non-anomalous regime of operations. It is to be noted that wherein the regime identified for the time series segment is not available in the regime database, and is not identified as anomalous, then the unmatched and non-anomalous regime of operation is added as a new regime to the regime database. Predictive models relevant to the new regime are re-tuned using data from the new regime. Physics-based models are also tuned using data from the new regime.

In the preferred embodiment, the process optimization module (130) of the system (100) is configured to optimize a plurality of key performance parameters of each group of the plurality of industrial assets. Herein, the process optimization is carried out to identify the optimum operating decisions to meet operations and/or maintenance objectives of the industrial assets within pre-determined process, equipment, and operating constraints. Operations objectives can be maximizing the output, quality, efficiency, etc. or minimizing the energy consumption, emissions, cost of operation, cost of maintenance, etc. Predictive models required for objective and constraint functions, lower and upper bounds of manipulated variables, and objective and constraint functions for each regime are stored in the optimization database. The process optimization module (130) selects prediction models, manipulated variables and their bounds and constraints that are suitable for each identified regime and grouped industrial assets from the optimization database and performs optimization to identify the optimized values for manipulated variables (MVs) for the given set of objectives and constraints.

It would be appreciated that the data-driven models include models built using statistical, machine learning or deep learning techniques such as variants of regression (multiple linear regression, stepwise regression, forward regression, backward regression, partial least squares regression, principal component regression, Gaussian process regression, polynomial regression, etc.), decision tree and its variants (random forest, bagging, boosting, bootstrapping), support vector regression, k-nearest neighbors regression, spline fitting or its variants (e.g. multi adaptive regression splines), artificial neural networks and it variants (multi-layer perceptron, recurrent neural networks & its variants e.g. long short term memory networks, and convolutional neural networks) and time series regression models.

Further, the data-driven models also include statistical, machine learning or deep learning based one-class or multi-class classification, scoring or diagnosis models such as principal component analysis, Mahalanobis distance, isolation forest, random forest classifiers, one-class support vector machine, artificial neural networks and its variants, elliptic envelope and auto-encoders (e.g. dense auto-encoders, LSTM auto-encoders, CNN auto-encoders). The data-driven models can be point models (that do not consider temporal relationship among data instances for predictions) or time series models (that consider temporal relationship among data instances for predictions).

Furthermore, the data-driven models also include reduced-order models or response surface models of physics-based models. Response variables include key process parameters in process plants and can be one or more of productivity, yield, cycle time, energy consumption, waste generation, emissions, quality parameters, condition of equipment, availability, mean time between failures, number of unplanned shutdowns, cost of operation, cost of maintenance, or a weighted combination of the above that is indicative of the condition of the plant, process and/or equipment. The predictions from various models aid the plant operator or engineer to take informed decisions concerning the operation of the plant, to keep a check on possible anomalies, to classify the state/health of the plant, to identify the root cause of detected anomalies, to estimate remaining useful life of various processes or equipment, and to optimize the operation in order to achieve desired levels of key process parameters.

In the preferred embodiment, the recommendation module (132) of the system (100) recommends one or more optimal settings of one or more manipulated variables identified through via process optimization for each regime group of the plurality of industrial assets.

In another embodiment illustrating creation of an adaptive learning knowledge base. The first set of data (operations data, laboratory data, environment data, maintenance data, soft-sensed data estimated using physics-driven or data-driven soft sensors, etc.) from multiple industrial assets of similar nature and function located in the same geographical location or at multiple geographical locations is used for performing regime identification for each of the plurality of industrial assets and regime-based process optimization for groups of industrial assets. The first set of data residing in multiple databases in the respective industrial assets can be brought to a common processor via a data communication network.

Figure 5:
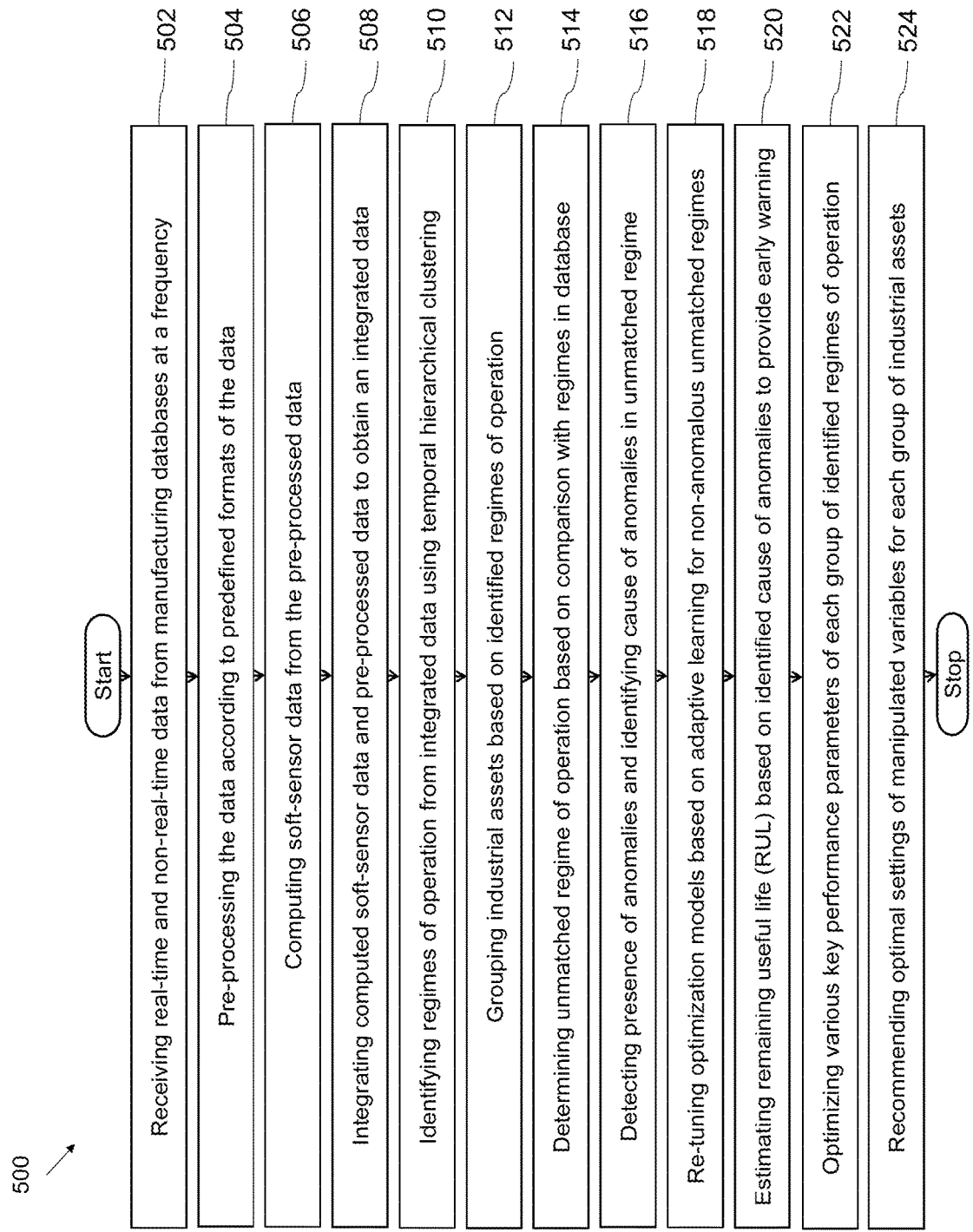
FIG. 5 is a flow diagram to illustrate a method for regime-based process optimization of a plurality of industrial assets of industrial manufacturing plant or process, in accordance with some embodiments of the present disclosure.

Referring FIG. 5, to illustrate a processor-implemented method (500) for a regime-based process optimization of industrial assets. It would be appreciated that the method (500) is part of a regime-based optimization process module associated with one or more industrial assets of the industrial manufacturing or process plant. The one or more industrial assets herein refer to static assets such as one or more industrial units of a processing plant, the entire process or manufacturing plant that comprises processing units in series and/or parallel, and mobile assets or equipment such as aero engine, automobile engine, etc.

Initially, at the step (502), a plurality of data is received from one or more databases of a plurality of industrial assets at a pre-determined frequency. The plurality of data comprises real-time and non-real-time data. The one or more databases include operations database, laboratory database, maintenance database and an environment database.

In the preferred embodiment, at the next step (504), the received plurality of data is pre-processed for verification of availability of received plurality of data, removal of redundant data, unification of sampling frequency, filtering of data, identification and removal of outliers, imputation of missing data, and synchronization by incorporating appropriate lags and integration of a plurality of variables from one or more databases. It is to be noted that the plurality of models includes one or more data-driven models, one or more physics-based models and one or more hybrid models.

In the preferred embodiment, at the next step (506), computing a plurality of soft-sensor data using the preprocessed data of the plurality of industrial assets. Wherein, the plurality of soft-sensors includes physics-based soft sensors and data-driven soft sensors.

In the preferred embodiment, at the next step (508), integrating the preprocessed plurality of data and the computed plurality of soft-sensor data to obtain an integrated data for each of the plurality of industrial assets.

In the preferred embodiment, at the next step (510), identifying one or more regimes of operation of the plurality of industrial assets from the integrated data using time series hierarchical clustering on segmented data. The hierarchical clustering comprising obtaining one or more regime sequences from the integrated data, computing a regime similarity score corresponding to each of the one or more regime sequences, comparing the computed regime similarity score with a predefined threshold of regime similarity score to identify one or more regimes of operation of the plurality of industrial assets.

In the preferred embodiment, at the next step (512), grouping the plurality of industrial assets into one or more groups based on the identified one or more regimes of operation.

In the preferred embodiment, at the next step (514), determining at least one unmatched regime of operation from the one or more identified regimes of operation based on comparison with at least one past regime of operation stored in a regime database.

In the preferred embodiment, at the next step (516), detecting presence of one or more anomalies in the unmatched regime of operation using a plurality of data-driven anomaly detection models and identifying at least one cause of the detected one or more anomalies in the unmatched regime of operation of the plurality of assets using a plurality of data-driven anomaly diagnosis models.

In the preferred embodiment, at the next step (518), re-tuning one or more predictive models according to the unmatched and non-anomalous regime of operations. It is to be noted that wherein the regime identified for the time series segment is not available in the regime database, and is not identified as anomalous, then the unmatched and non-anomalous regime of operation is added as a new regime to the regime database. Predictive models relevant to the new regime are re-tuned using data from the new regime. Physics-based models are also tuned using data from the new regime.

In the preferred embodiment, at the next step (520), estimating a remaining useful life (RUL) based on the identified cause of the anomaly to provide early warning of failure of one or more components in one or more assets.

It is to be noted that wherein the regime identified for the time series segment is not available in the regime database, and is not identified as anomalous, then the identified regime is added as a new regime to the regime database. Predictive models relevant to the new regime are re-tuned using data from the new regime and the adaptive learning module of the system. Further, the physics-based models are also re-tuned using data from the new regime. Re-tune predictive model are used in optimization of the plurality of key performance parameters of each group of the plurality of industrial assets.

In the preferred embodiment, at the next step (522), optimizing a plurality of key performance parameters for regime group of the plurality of industrial assets using predictive models, objective, and constraints, and manipulated variables and their limits specific to each regime group.

In the preferred embodiment, at the last step (524), recommending one or more optimal settings of one or more manipulated variables for each regime group of the plurality of industrial assets.

It would be appreciated that if the identified regimes of operation for one or more industrial assets do not match with any of the past operating regimes available in the regime database, the time series data segment is analyzed for anomalies/faults. The anomaly detection and diagnosis models available for the previous normal regime of the asset will be used for performing anomaly detection and diagnosis for the time series data segment. If a process or an equipment fault is detected, diagnosis is carried out to identify the root cause for the fault. Further, wherein the regimes of operation identified for the time series segment are not available in the regime database, and are not identified as anomalous, then the identified regimes of operation are added as a new regime to the regime database. Predictive models relevant to the new regime are built in an adaptive learning module using integrated data from the new regime. Physics-based models relevant to the industrial assets are also tuned using integrated data from the new regime.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of identifying operating regimes and regime shifts in static and mobile industrial assets in order to perform model-based process optimization and predictive maintenance (fault detection, fault diagnosis and RUL estimation) for multiple industrial assets being monitored. Therefore, embodiments herein provide a system and method for the regime-based optimization of one or more industrial assets of the industrial manufacturing process.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for recommending one or more optimal settings for operation of a plurality of industrial assets comprising:
receiving, via one or more hardware processors, a plurality of data of the plurality of industrial assets from one or more data sources;
preprocessing, via the one or more hardware processors, the received plurality of data according to one or more predefined data formats;
computing, via the one or more hardware processors, a plurality of soft-sensor data using the preprocessed data of the plurality of industrial assets, wherein the plurality of soft-sensors includes physics-based soft sensors and data-driven soft sensors;
integrating, via the one or more hardware processors, the pre-processed plurality of data and the computed plurality of soft-sensor data to obtain an integrated data for each of the plurality of industrial assets;
identifying, via the one or more hardware processors, one or more regimes of operation of the plurality of industrial assets from the integrated data using a temporal hierarchical clustering on one or more segments of integrated data, wherein the temporal hierarchical clustering comprising:
obtaining one or more regime sequences from the integrated data;
computing a regime similarity score corresponding to each of the one or more regime sequences; and
comparing the computed regime similarity score with a predefined threshold of regime similarity score to identify one or more regimes of operation of the plurality of industrial assets;
grouping, via the one or more hardware processors, the plurality of industrial assets into one or more groups based on the identified one or more regimes of operation;
optimizing, via the one or more hardware processors, a plurality of key performance parameters of each group of the plurality of industrial assets using a plurality of optimization models specific to the identified regimes of operation; and
recommending, via the one or more hardware processors, one or more optimal settings of one or more manipulated variables for each group of the plurality of industrial assets based on the optimization of the plurality of key performance parameters.

2. The method of claim 1, further comprising:
determining, via the one or more hardware processors, at least one unmatched regime of operation from the one or more identified regimes of operation based on comparison with at least one past regime of operation stored in a regime database;
detecting, via the one or more hardware processors, presence of one or more anomalies in the unmatched regime of operation using a plurality of data-driven anomaly detection models;
identifying, via the one or more hardware processors, at least one cause of the detected one or more anomalies in the unmatched regime of operation of the plurality of assets using a plurality of data-driven anomaly diagnosis models;
estimating, via one or more hardware processors, a remaining useful life (RUL) based on the identified cause of the anomaly to provide early warning of failure of one or more components in one or more assets.

3. The method of claim 2, wherein re-tuning the plurality of predictive models based on adaptive learning process for non-anomalous unmatched regime of operations.

4. The method of claim 1, wherein the plurality of data sources comprises a plant automation system, a data historian, a distributed control system, a laboratory information management system, an environment database, a maintenance database, and an operation database.

5. The method of claim 1, wherein preprocessing comprising:
removing, via the one or more hardware processors, noise, and outliers from the received data;
achieving, via the one or more hardware processors, uniform sampling frequency of the received time series data; and
imputing, via the one or more hardware processors, missing values of the received plurality of data; and
synchronizing, via the one or more hardware processors, imputed data from the plurality of data sources by incorporating appropriate lags.

6. The method claimed in claim 1, wherein the determined unmatched regime of operation is added to the regime database.

7. The system for regime-based process optimization of a plurality of industrial assets comprising:
an input/output interface for receiving a plurality of data of the plurality of industrial assets from one or more data sources;
one or more hardware processors;
a memory in communication with the one or more hardware processors, wherein the one or more hardware processors are configured to execute programmed instructions stored in the memory, to:
preprocess the received plurality of data according to one or more predefined formats of the data;
compute a plurality of soft-sensor data using the preprocessed data of the plurality of industrial assets, wherein the plurality of soft-sensors includes physics-based soft sensors and data-driven soft sensors;
integrate the preprocessed plurality of data and the computed plurality of soft-sensor data to obtain integrated data for each of the plurality of industrial assets;
identify one or more regimes of operation of the plurality of industrial assets from the integrated data using temporal hierarchical clustering on one or more segments of integrated data, wherein the temporal hierarchical clustering comprising:
obtaining one or more regime sequences from the integrated data;
computing a regime similarity score corresponding to each of the one or more regime sequences; and
comparing the computed regime similarity score with a predefined threshold of regime similarity score to identify one or more regimes of operation of the plurality of industrial assets;
group the plurality of industrial assets into one or more groups based on the identified one or more regimes of operation;
optimize a plurality of key performance parameters of each group of the plurality of industrial assets using the plurality of optimization models specific to the identified regimes of operation; and
recommend one or more optimal settings of one or more manipulated variables for each group of the plurality of industrial assets.

8. The system of claim 7, wherein the one or more hardware processors are configured to execute programmed instructions stored in the memory, to:
determine at least one unmatched regime of operation from the one or more identified regimes of operation based on comparison with at least one past regime of operation stored in a regime database;

detect presence of anomalies in the at least one unidentified regime of operation using a plurality of data-driven anomaly detection models;

identify at least one cause of the detected anomalies in the regime of operation of the plurality of assets using a plurality of data-driven anomaly diagnosis models; and estimate remaining useful life (RUL) based on the identified cause of the anomaly to provide early warning of failure of one or more components in one or more assets.

9. A non-transitory computer readable medium storing one or more instructions which when executed by one or more processors on a system, cause the one or more processors to perform method for regime-based process optimization of a plurality of industrial assets comprising:

receiving, via one or more hardware processors, a plurality of data of the plurality of industrial assets from one or more data sources;

preprocessing, via the one or more hardware processors, the received plurality of data according to one or more predefined data formats;

computing, via the one or more hardware processors, a plurality of soft-sensor data using the preprocessed data of the plurality of industrial assets, wherein the plurality of soft-sensors includes physics-based soft sensors and data-driven soft sensors;

integrating, via the one or more hardware processors, the pre-processed plurality of data and the computed plurality of soft-sensor data to obtain an integrated data for each of the plurality of industrial assets;

identifying, via the one or more hardware processors, one or more regimes of operation of the plurality of industrial assets from the integrated data using a temporal hierarchical clustering on one or more segments of integrated data, wherein the temporal hierarchical clustering comprising:

obtaining one or more regime sequences from the integrated data;

computing a regime similarity score corresponding to each of the one or more regime sequences; and comparing the computed regime similarity score with a predefined threshold of regime similarity score to identify one or more regimes of operation of the plurality of industrial assets;

grouping, via the one or more hardware processors, the plurality of industrial assets into one or more groups based on the identified one or more regimes of operation;

optimizing, via the one or more hardware processors, a plurality of key performance parameters of each group of the plurality of industrial assets using a plurality of optimization models specific to the identified regimes of operation; and recommending, via the one or more hardware processors, one or more optimal settings of one or more manipulated variables for each group of the plurality of industrial assets based on the optimization of the plurality of key performance parameters.

* * * * *